Jan. 5, 1960 R. A. FOTLAND 2,919,574
ULTRASONIC INSPECTION DEVICE
Filed June 12, 1957

RICHARD A. FOTLAND
INVENTOR.

BY Lawrence I. Field

United States Patent Office 2,919,574
Patented Jan. 5, 1960

2,919,574

ULTRASONIC INSPECTION DEVICE

Richard A. Fotland, Cleveland, Ohio, assignor to Horizons Incorporated, a corporation of New Jersey Application June 12, 1957, Serial No. 665,228

2 Claims. (Cl. 73—67.6)

This invention relates to an ultrasonic inspection system. Essentially, it relates to a system wherein an ultrasonic two-dimensional picture formed on a piezoelectric plate is translated into an electrical time-sequential picture for portrayal as a visible image on a television screen and to the application of such a system to the inspection of objects.

Many devices have been suggested for inspection and non-destructive testing of objects. In one device, described in United States Patent 2,164,125, the electrical output of an oscillator is converted by a transducer into ultrasonic waves which are directed to pass through a solid object to be inspected. The device includes a second transducer which picks up or receives the mechanical vibrations after they have been modified by the body which is being inspected and an amplifier which amplifies the electrical signal generated by the pickup device and which may be combined with the pickup device. The present invention is directed primarily to a generally similar pickup device which is more suited to the inspection of objects of considerable size, than that described in the patent; and to the system in which the improved pickup device is used.

Figure 1:
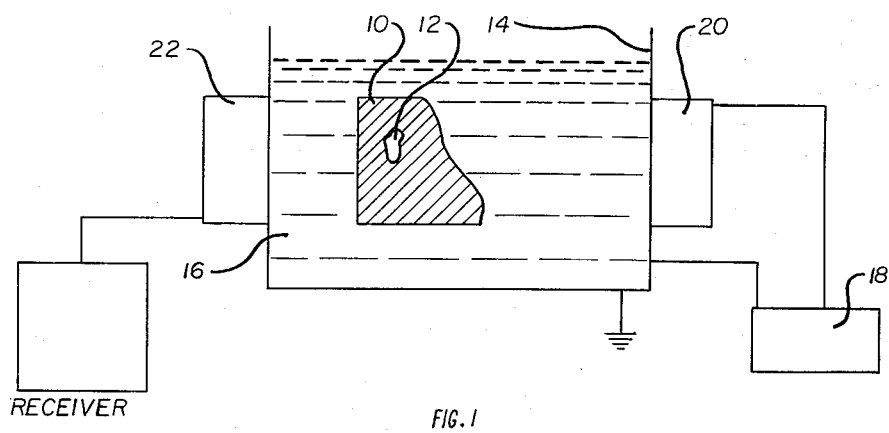
Figure 2:
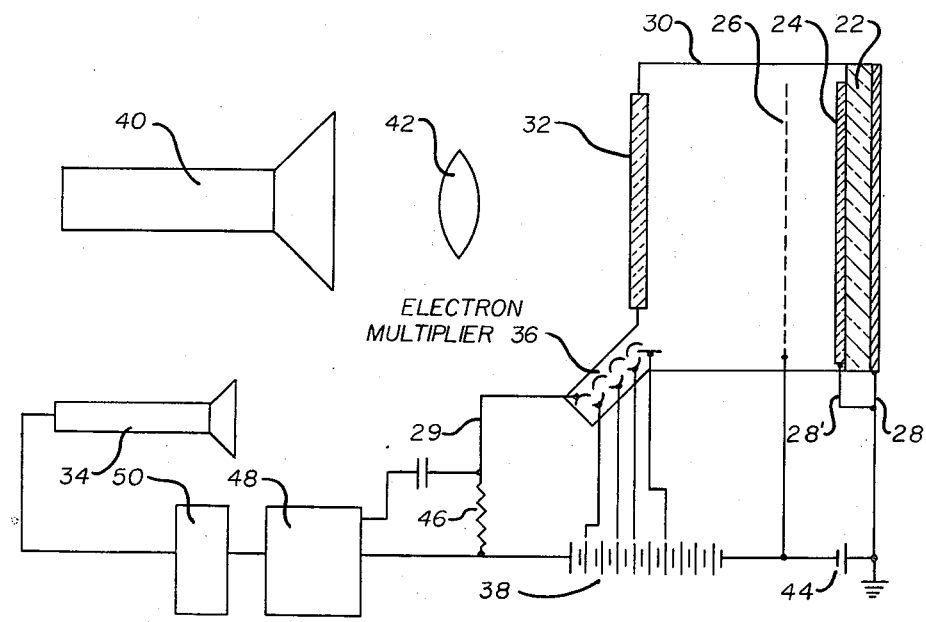

The invention will be more fully understood by reference to the accompanying drawings in which:

Figure 1 schematically illustrates one system for inspection of solid bodies; and Figure 2 represents in slightly greater detail the improved receiver portion of the system in accordance with the present invention.

Referring to the drawings, a solid object 10 to be examined, having a discontinuity 12, such as a casting cavity or blowhole, is placed in a tank 14 of liquid 16. Adjacent to the tank there is an oscillator 18 which is connected to a transducer 20 whereby the electrical impulses generated by the oscillator are converted to mechanical waves. The sending crystal may be a quartz plate, or Rochelle salt or barium titanante, or any other known piezoelectric material, positioned so that the ultrasonic waves sent by the piezoelectric transducer pass through the object 10 which is to be inspected. The waves pass through the object and are modified by any inhomogeneities in the object and then pass to a second transducer 22 which is positioned on the opposite side of tank 14.

As shown in greater detail in Figure 2, the pickup device consists preferably of a means for converting the supersonic waves into electrical impulses and of appropriate means associated therewith for translating the electrical signal produced by the transducer into a visible image. In an alternative construction, which is particularly useful when the object to be inspected has planar or regular faces, both transducer 20 and transducer 22 are positioned on opposite sides of the object itself. Irrespective of whether the transducer is disposed as in Figure 1 or in direct physical contact with the body to be inspected, the transducer 22 is incorporated into a pickup device which comprises an evacuated envelope 30, one face of which comprises the transducer 22 and the opposite face of which comprises a window 32. Transducer 22 may be formed of any piezoelectric material. Elements of quartz, Rochelle salt, barium titanate or other known piezo materials, have been found to be satisfactory for the purpose.

One surface of the piezoelectric plate 22 is maintained in physical contact with the body being inspected or with the tank 14. The opposite surface of the piezoelectric plate 22 bears a layer 24 of a high resistance photoemissive material which is positioned so as to be scanned by means of a moving spot of light. As the photoemissive material, a thin layer of cesium activated silver or any other suitable photoemissive material may be used. In the system shown the scanning spot is produced by a cathode ray tube 40 and is focused by a lens 42, but it will be understood that other sources of light may be substituted. Opposite the photoemissive material, and spaced about five (5) centimeters from layer 24, is a transparent electrode 26, maintained at a constant potential by means 44. Leads 28 and 28' connect the face of the piezoelectric plate nearest to the body being inspected and the photoemissive layer respectively to ground. An electron multiplier 36 is connected through a source of potential 38 to electrode 26 in order to increase the sensitivity of the device. A lead 29 connects the output of the electron multiplier to a load resistor 46 and to an amplifier 48. The amplified signal is fed through a demodulator 50 and is passed into the circuit of a conventional cathode ray tube 34, whose electron beam is scanned in synchronism with the beam of scanner 40. The demodulated output signal is used to vary the brightness of the spot on the face of tube 34 and hence the picture on tube 34 represents the intensity of the acoustic wave incident on transducer 22, which in turn is indicative of the presence of flaws in the body to be inspected.

In service, the device operates as follows: Acoustic waves, generated by the piezoelectric generator 18, 20 are transmitted through the body 10 under inspection. Imperfections 12 in the body diffract the acoustic waves, thereby causing the acoustic wave fronts incident upon the piezoelectric receptor 22 to contain information in the form of the variations in the amplitude of the wave as a function of its position at the receptor. The incident wave causes an alternating potential, proportional to the amplitude of the wave, to appear across the receptor element. At the same time, a light beam projected from the flying spot scanner 40 is allowed to scan the photoemissive surface 24 at the back of the piezoelectric receptor 22. Any scanning pattern may be used; a standard television scanning pattern has been found to be satisfactory. The photoelectrons generated by this scanning light beam have an energy spectrum in which the energies range from zero up to the energy of the incident photons. With no incident acoustic energy on the receptor, the grid 26 permits only photoelectrons emitted with energies greater than approximately ½ electron volt to reach the electron multiplier. Electrons with energies less than approximately ½ electron volt are returned to the photoemissive layer. The alternating potential difference appearing across the piezoelement due to an incident acoustic wave also apears between the grid 26 and the photoemissive layer 24. The potential difference across these elements modulates the flow of photoelectrons from the photoemitter to the electron multiplier 36. During the portion of the alternating potential cycle when the photoemitter is negative, more electrons are permitted to reach the elecron muliplier and during the positive part of the cycle, fewer electrons are permitted to reach the electron multiplier. The alternating current is amplified by secondary emission in the electron multiplier and causes an alternating potential to appear across the load resistor 46. This alternating potential is amplified by the wide band amplifier 48, demodulator 50, and used to vary the brightness of the spot on a conventional cathode ray tube 34 whose electron beam is scanned in synchronism with the beam of the flying spot scanner. In this manner the cathode ray tube picture represents the intensity of the acoustic wave incident upon the receptor.

For best operation of this device, three critical parameters are adjusted for proper operation, namely:

(1) The scanning light beam sweep speed is adjusted so that during the time interval that the light beam is on any incremental area of the target at least three cycles in the potential variation due to any incident acoustic wave have passed. It can be seen, therefore, that the maximum sweep speed depends upon the frequency of the acoustic wave.

(2) The constant grid potential 44 is adjusted so that, with no acoustic input, the photocurrent reaching the electron multiplier is extremely low, i.e., the device should be operated near the cut-off point. This low dark current operation results in a greater sensitivity because of the reduced shot noise due to the dark current.

(3) The transverse resisitivity of the photoemissive surface must be kept within certain limits ($10^6$ to $10^8$ ohms/square). If the resistivity of the surface is too high, the surface will gradually attain an increasingly positive potential due to the emission of photoelectrons that are not returned to the photoelectric surface. After a certain time, this potential will drive the device beyond the cut-off point. The resistivity of the surface must be low enough so that the photoelectrons passing through the grid are replenished by conduction through the photoemissive surface. The resistivity must not be too low, however, or the A.C. potential appearing across an incremental area of the piezoelectric receptor will also appear across other elements. This lower limit of resistivity is determined by the frequency of the acoustic waves and the capacity of the piezoelement.

I claim:

1. A device for rendering an acoustical intensity field visible comprising: an evacuated envelope; an optically transparent window forming one end portion of said envelope; a piezoelectric plate constituting the opposite end portion of said envelope; an electrically conductive coating on the surface of said piezoelectric plate outside of the envelope and a high resistance photoemissive layer, coating the surface of said piezoelectric plate within the evacuated envelope; a grid adjacent the photoemissive layer and biased approximately one-half volt negative with respect to the coating of the piezoelectric plate outside of said envelope; a scanning light beam positioned so as to sequentially scan each incremental area of the photoemissive layer through the optically transparent window constituting the end portion of said evacuated envelope opposite to said piezoelectric plate; an electron multiplier connected to a source of positive D.C. potential through a load resistor; and means for portraying the electrical output signal in the form of a visual image, said means comprising an amplifier electrically connected to said electron multiplier, to receive a signal from same, a demodulator through which the amplified signal is passed and a cathode-ray tube receiving said demodulated signal and adapted to be scanned in synchronism with the scan of the photoemissive layer.

2. In apparatus for inspecting a solid article in which means are provided for applying ultrasonic waves to one side of said article and for converting the resulting image of the pattern of the ultrasonic waves passed through the solid object and received on a side other than the side to which ultrasonic waves are applied into a visible image, the improved device for rendering the resulting acoustical intensity field visible comprising: an evacuated envelope; an optically transparent window forming one end portion of said envelope; a piezoelectric plate constituting the opposite end portion of said envelope and adapted to be positioned on the side of the article being inspected, other than the side to which ultrasonic waves are applied; an electrically conductive coating on the surface of said piezoelectric plate outside of the envelope and a high resistance photoemissive layer, coating the surface of said piezoelectric plate within the evacuated envelope; a grid adjacent the photoemissive layer and biased approximately one-half volt negative with respect to the coating of the piezoelectric plate outside of said envelope; a scanning light beam positioned so as to sequentially scan each incremental area of the photoemissive layer through the optically transparent window constituting the end portion of said evacuated envelope opposite to said piezoelectric plate; an electron multiplier connected to a source of positive D.C. potential through a load resistor; and means for portraying the electrical output signal in the form of a visual image, said means comprising an amplifier electrically connected to said electron multiplier, to receive a signal from same, a demodulator through which the amplified signal is passed and a cathode-ray tube receiving said demodulated signal and adapted to be scanned in synchronism with the scan of the photoemissive layer.

References Cited in the file of this patent

UNITED STATES PATENTS

| 2,164,125 | Sokoloff | June 27, 1939 |
| 2,510,063 | Cawein | June 6, 1950 |

FOREIGN PATENTS

| 743,063 | Great Britain | Jan. 11, 1956 |
| 757,248 | Great Britain | Sept. 19, 1956 |